Figure 1:
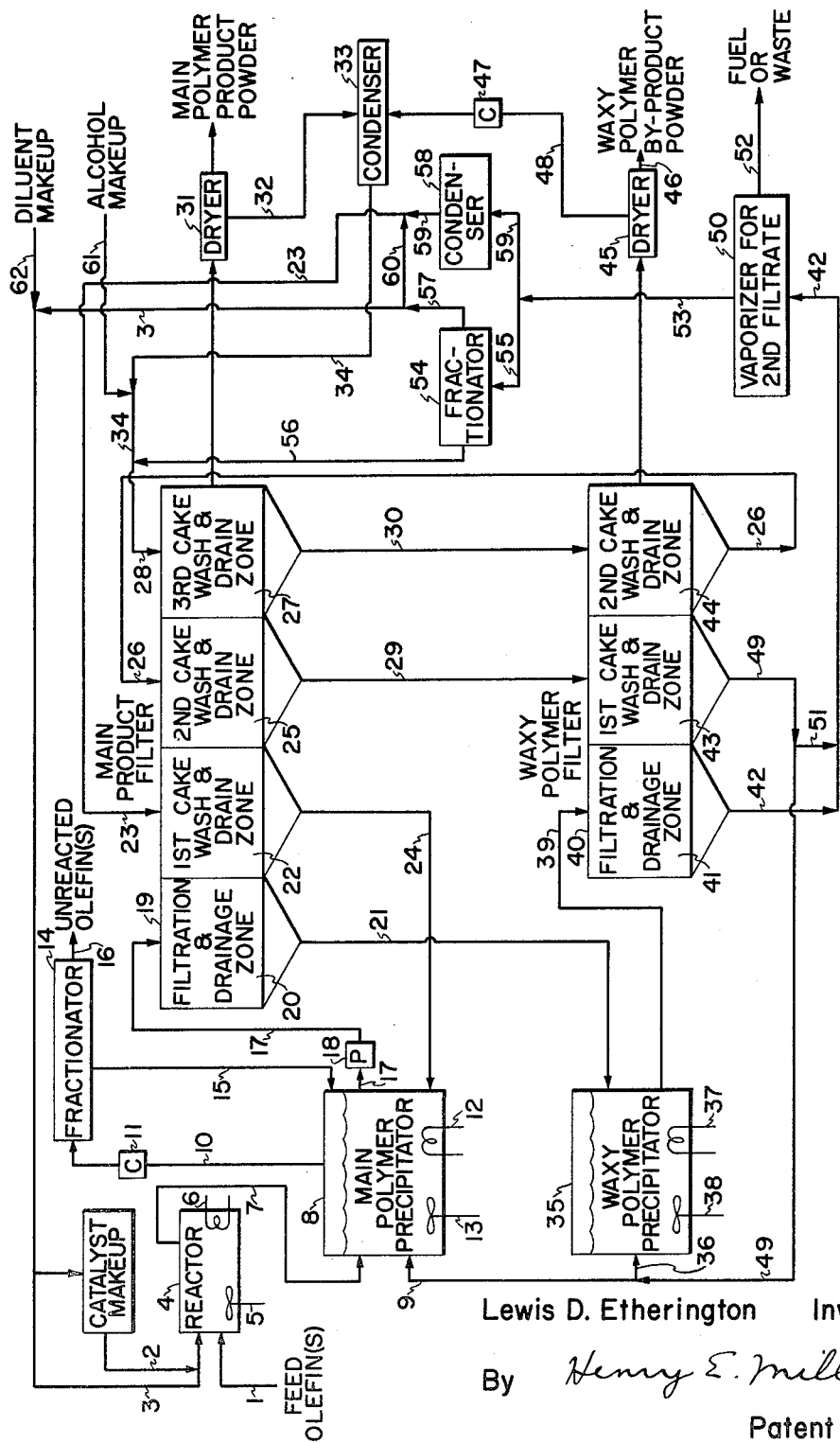

Nov. 3, 1964   L. D. ETHERINGTON   3,155,640
LOW PRESSURE POLYMERIZATION PRODUCT RECOVERY PROCESS
Filed Oct. 26, 1959

Lewis D. Etherington   Inventor
By Henry E. Millson, Jr.
Patent Attorney

United States Patent Office 3,155,640
Patented Nov. 3, 1964

3,155,640
LOW PRESSURE POLYMERIZATION PRODUCT
RECOVERY PROCESS
Lewis D. Etherington, Westfield, N.J., assignor to Esso Research and Engineering Company, a corporation of Delaware
Filed Oct. 26, 1959, Ser. No. 848,823
17 Claims. (Cl. 260—93.7)

This invention relates to the polymerization of olefins and more particularly to a novel process for controlling the quantity of low molecular weight and atactic polymer in polyolefin products to improve product quality.

The preparation of polymers such as polyethylene, polypropylene, etc. by the use of catalysts comprising mixtures of reducing metals or metal compounds such as aluminum alkyls with reducible heavy metal compounds such as the halides, acetyl acetonates and the like of the metals of groups IV through VI and VIII of the Periodic Table, e.g. of titanium, zirconium, vanadium, etc. at relatively low pressures is now well known to the art. See for example Belgian Patent 533,362, "Chemical and Engineering News," April 8, 1957, pages 12 through 16, and "Petroleum Refiner," December 1956, pages 191 through 196.

Prior to the present, it was also discovered that the properties of the final polyolefin products are dependent in part on the quantity of low molecular weight polymer contained therein. Copending application 687,485, filed October 1, 1952, to B. R. Tegge and J. F. Ryan, discloses a process wherein the quantity of low molecular weight polymer in the final product can be controlled.

An improved integrated process whereby the quantity of low molecular weight and atactic polymer (hereafter referred to as waxy polymer) in the final product can be very accurately controlled has now been discovered. Also, improved filter operability, efficient removal of catalyst residue from the polymer, and preparation of the product for efficient drying are realized by the process of this invention. In particular, the present process involves the steps of (1) treating a polymerization reactor product (comprising predominantly hydrocarbon diluent, a substantially completely dissolved waxy polymer fraction and partially dissolved crystalline main product) with a controlled amount of low molecular weight alcohol for substantially complete precipitation of the main product and controlled partial precipitation of the waxy polymer fraction, (2) filtering the resulting slurry at a temperature and pressure such that the equilibrium vapor pressure of the slurry is no higher than the filter blanket gas pressure on the filtrate side of the filter screen, (3) first washing the resulting filter cake with a wash solution having substantially the same polymer solvency, i.e. substantially the same temperature and ratio of low boiling hydrocarbon to low molecular weight alcohol as is present in the filtrate, (4) subsequently washing the filter cake with substantially pure low molecular weight alcohol, and (5) drying the filter cake polymer product. Another important feature is the use of the same alcohol stream for washing and precipitating both polymer product fractions.

The advantages afforded by the process of the invention will be understood from the subsequent description wherein reference will be made to the accompanying drawing which is a schematic flow plan of a system adapted to carry out the process of the invention.

The polymer slurries which can be utilized in the present invention are product slurries formed by the polymerization and copolymerization of monoolefins and diolefins such as polyethylene, polypropylene, polybutylene, ethylene-propylene copolymer, ethylene-isoprene copolymer, polyisoprene, etc. The catalysts used to prepare these polymer slurries which are treated by the process of the invention are mixtures of reducing metal-containing materials and reducible heavy metal compounds of the transition metals of the IV, V, VI and VIII groups of the Periodic System. In particular, the reducing metal-containing materials include the alkali and alkaline earth metals, their alloys, and their alkyl and/or aryl compounds, and alkyl and aryl derivatives of other metals which have sufficient stability to permit reaction in their compound form with a reducible heavy metal compound, e.g. organo-aluminum compounds such as triisobutyl aluminum, tripropyl aluminum, triethyl aluminum, dialkyl aluminum halides such as diethyl aluminum halides, dimethyl aluminum halides, methyl and ethyl aluminum dihalides. Organo-aluminum compounds with two hydrocarbon radicals, or at least one hydrocarbon radical and one hydrogen, and containing an electron-attracting group such as an alkoxy, halogen, organic nitrogen and the like can be used. Mixtures of the above reducing compounds can also be used, such as mixtures containing diethyl aluminum chloride and triethyl aluminum. The organo-aluminum compounds, especially trialkyl aluminum and dialkyl aluminum halide, are preferred herein. All of the above compounds and the methods for their preparation are well known to the art. The invention can be used for other polymer product slurries in which the polymer is partially dissolved in a solvent medium and it is desired to extract at least a portion of the more soluble polymer fraction from the less soluble fraction.

Reducible heavy metal compounds forming a component of the catalyst include hydrocarbon-soluble inorganic compounds such as the halides, oxy-halides, complex halides, and organic compounds such as alcoholates, acetates, benzoates, and acetyl acetonates of the transition metals of the IV, V, VI and VIII groups of the Periodic System, e.g. titanium, zirconium, hafnium, thorium, uranium, vanadium, niobium, tantalum, chromium, molybdenum, tungsten, and iron. The metal halides, particularly the chlorides, are generally preferred. Titanium and zirconium are the preferred metal components since they are the most active of these metals. Titanium tetrachloride is the reducible heavy metal compound particularly preferred herein.

Diluents used in the polymerization process include aliphatic and aromatic hydrocarbons such as hexane, heptane, isooctane, benzene, toluene, xylenes, cyclohexane, etc. The reaction is carried out by contacting an olefin feed with a hydrocarbon diluent in admixture with a catalyst under polymerization conditions. After the reaction has proceeded to the desired extent, the polymerization mixture is withdrawn from the reactor for treatment according to the process of the invention. The polymer-hydrocarbon mixture contains from 5 to 15 wt. percent polymer. This mixture contains some main product in suspension, some in solution, and a waxy polymer fraction which is almost completely dissolved. Unreacted olefins and catalyst residue are also present in the reactor effluent. The critical operations to be performed on this effluent for preparation of a soluble polymer are: (1) efficient separation of the waxy and main product fractions, (2) removal of catalyst residues (ash) and (3) removal of most of the diluent to avoid polymer solvation during heating for drying. A very difficult problem is prevention of waxy polymer precipitation with main product during filtration and alcohol cake wash. The invention concerns these objectives and will be described with reference to the attached drawing wherein additional features of the invention will be described.

The polyolefin product is produced in hydrocarbon diluent medium in reactor 4. Feed olefin or olefins are introduced into the reactor via line 1, catalyst solution or slurry via line 2, and diluent through line 3. The reactor slurry is agitated with stirrer 5 and cooled with coil 6 for good reactor control. The reaction slurry overflows through line 7 to the first polymer precipitation tank 8. Alcohol-rich liquid enters tank 8 which is maintained at a temperature of from 120 to 180° F. for controlled precipitation of the dissolved main product in the slurry entering via line 7. The alcohol-rich liquid contains from 60 to 90 vol. percent of a $C_1$–$C_6$ aliphatic alcohol, and is added in amount sufficient to precipitate usually from 85 to 97 wt. percent of the total polymer in the slurry, which is generally accomplished by adding amounts of from 10 to 30 vol. percent, based on the volume of slurry. The optimum temperature and alcohol concentration in vessel 8 will be dictated by the molecular weight of the alcohol and by requirements for good digestion of catalyst residues, as well as by the desired fraction of polymers to be left in solution. Volatile unreacted olefins flash from slurry in tank 8 and are removed via line 10 and compressor 11. Heating or cooling is applied via coil 12 to control the pressure and slurry temperature in tank 8. The speed of compressor 11 is varied to facilitate pressure control on tank 8. Agitator 13 in tank 8 prevents the polymer from settling and facilitates the temperature control. The flash vapors in the line 10 are fractionated in tower 14, and the liquid alcohol-diluent fraction is returned via line 15 to tank 8, or used as cake wash. Unreacted olefins leave fractionator 14 via line 16, and can be purged, or returned totally or in part to the reactor after residual alcohol removal.

Slurry from tank 8, containing the main polymer product as undissolved suspension, and the waxy polymer fraction and digested catalyst residue as a solution, enters line 17 and pump 18, and is conveyed to filtration and drainage zone 20 in enclosed main product slurry filter 19. This filter is preferably a rotating pan filter of donut shape, but is shown as an extended section for convenience. However, other type filters such as rotary drum filters or basket centrifuges can be employed. Suction is usually applied on the filtrate side of the filter screen to promote drainage, and some filter blanket gas passes through the cake and screen with the filtrate. The pressure in precipitator 8 is adjusted to a value no higher than the gas pressure on the filtrate side of the filter screen, in order to prevent filtrate flashing as it undergoes a pressure reduction while passing through the cake. Pump 18 is then used to force vessel 8 slurry into the higher pressure filter feed zone 20 on the cake side. In zone 20 the mother liquor filtrate is discharged via line 21. A filter cake containing some residual mother liquor is left in zone 20 and this cake is then introduced into a first cake wash zone 22, and encounters fresh hydrocarbon-rich wash liquid which enters via line 23 and is sprayed in a near-continuous sheet over the width of the cake bed to wash out the residual mother liquor. The cake wash liquid in line 23 has substantially the same alcohol-diluent weight ratio and temperature as the feed slurry in line 17, for example, 1/4 weight ratio. Therefore, dissolved waxy polymer in the residual mother liquor is not precipitated to seal the cake interstices and contaminate the main product excessively during this wash. The wash liquid from line 23 drains through the cake, displaces a large portion of the residual mother feed liquor left in the cake from the filtration zone, is segregated, and leaves the first cake wash zone 22 in line 24. The spent wash liquid in line 24 contains a much lower concentration of dissolved ash and dissolved waxy polymer than the feed in line 17. Therefore, this spent wash is sent to precipitation tank 8 via line 24 to dilute the dissolved polymer and ash, and to add to the total quantity of liquid in filter feed line 17. This step serves to increase the fraction of net dissolved polymer and catalyst removed from the main product polymer via filtrate line 21. Thus the required quantity of cake wash liquid is reduced.

After drainage, the wet filter cake leaves the first wash zone and is moved into a second wash zone 25, encountering a wash liquid from line 26 of higher alcohol/diluent ratio than in the first wash zone, i.e. having an alcohol to diluent weight ratio of from 7/1 to 12/1. Also, this second wash liquid has lower concentrations of dissolved catalyst residue and polymer than the residual cake liquid entering the second wash zone. The cake then enters a third zone 27 where it is washed again with highly alcohol-rich liquid containing no dissolved polymer or catalyst residue introduced through line 28. Hence, the concentration of hydrocarbon diluent and dissolved catalyst residue (ash) in the cake liquid is progressively reduced in passing through the three cake wash zones. It is to be understood of course that fewer cake wash and drain zones can be operably employed. Also, more than one wash stage may be used on filter 19 for wash with hydrocarbon-rich liquid in line 23 to give more efficient extraction of dissolved waxy polymer from the main product cake, and to reduce the required quantity of this wash liquid. Furthermore, this wash liquid may be used exclusively on filter 19, and another filter (not shown) be used for cake wash with alcohol-rich solution. Any small quantity of dissolved polymer in the cake liquid not washed out in the first wash zone 22 of FIGURE 1 is assumed to be precipitated during contact with the alcohol-rich washes in the second and third zones 25 and 27. However, the small quantity of waxy polymer precipitated in these zones is not enough to seriously restrict the filtration of wash liquid through the cake, or to hurt the main product quality. The wash liquids leaving second and third zones 25 and 27 are segregated, withdrawn through lines 29 and 30, and used as described later.

The final washed and drained cake leaving the third wash zone 27 is discharged into dryer 31. Cake wash in zones 25 and 27 with alcohol-rich solution reduces the concentrations of hydrocarbon in the cake liquid and makes the cake easier to dry. In other words, the drying may be carried out at a higher temperature for faster drying if excessive hydrocarbon is not present to solvate the polymer and make it sticky. Thus, the alcohol-rich cake wash serves the dual purpose of ash and hydrocarbon reduction.

When the cake is discharged from the filter, the emptied screen is wet with alcohol-rich wash liquid. This liquid promotes precipitation of waxy polymer and screen plugging when the emptied screen is contacted with new feed slurry from line 17. Thus, it is a feature of this invention to wash the emptied screen with a small portion of the hydrocarbon-rich wash solution in line 23 prior to adding new feed slurry. A secondary preference is to wash the emptied screen with a portion of the hydrocarbon-rich spent wash from line 21.

Dryer 31 is preferably a continuous inclined rotary steam-tube type, but other types of dryers can of course be employed. The vaporized cake liquid is removed from the dryer via line 32, liquefied in condenser 33, and recycled via lines 34 and 28 as fresh cake wash liquid to the third wash zone 27. The dry main product powder from dryer 31 can be cooled, blended with pigment or other powdered additive, packaged as such, or extruded in more conventional pellet form for packaging.

The hydrocarbon-rich first filtrate leaving zone 20 via line 21 contains the bulk of the waxy polymer fraction in solution and the dissolved catalyst residue fraction. This filtrate is passed to waxy polymer precipitator 35. Alcohol-rich liquid is added to precipitator 35 through line 36 to precipitate at least a portion of the dissolved waxy polymer. The amount of alcohol-rich liquid added and the concentration of alcohol in the liquid depends on the amount of waxy polymer in the filtrate, the average molecular weight of the waxy polymer, the temperature of the precipitation etc., all of which factors can easily be determined. The resulting slurry in precipitator 35 can be cooled with coil 37 for better control of the precipitation. Agitator 38 is provided to keep the slurry from settling.

The waxy polymer slurry in precipitator 35 is conveyed through line 39 to filtration and draining zone 41 in filter 40. Filter 40 is a rotary drum or pan filter, preferably the former (for more practical thin-cake operation) if the polymer cake is tacky and difficult to filter. The feed mother liquor filtrate passes through the cake in zone 41, is segregated, and is discharged via line 42. The cake is then moved into first cake wash zone 43. Wash liquid of approximately the same alcohol/hydrocarbon ratio as filter 40 feed may be used in first wash zone 43, but usually the filter feed polymer is substantially completely precipitated, and alcohol-rich wash liquid is usually preferred for the first cake wash zone 43. The wash liquid entering the first cake wash zone through line 29 has a lower dissolved catalyst residue concentration than the residual mother liquid in the cake entering this zone. Thus, the ash content of the occluded cake liquid is reduced in first wash zone 43. The cake moves into a second wash zone 44 and is sprayed with a wash liquid of higher alcohol-diluent weight ratio and of even lower catalyst residue concentration through line 30 to further reduce the catalyst and hydrocarbon concentrations in the occluded cake liquid.

The final washed waxy polymer filter cake is discharged from zone 44 and is dried in dryer 45. This dryer is preferably a batch vacuum type for relatively low temperature drying in view of the tacky nature and comparatively small quantity of the waxy by-product polymer fraction. Of course, other dryers can be employed. The dry polymer powder leaving dryer 45 through line 46 is handled in a similar manner as the main product powder, as described above. The vaporized liquid from dryer 45 can be compressed in compressor 47 via line 48, liquefied in condenser 33 and recycled in line 34 as cake wash liquid, as described above. The condensed vapor from the dryers contains essentially none of the non-volatile catalyst residue and is suitable as fresh cake wash. Any residual catalyst ash in the cake liquid entering the dryers is, of course, left with the dried polymers. The use of vaporized cake liquid condensate from the dryers as filter cake wash reduces the load on vaporizer 50, fractionator 54, etc. whose functions are described later.

The alcohol-rich wash liquid leaving third cake wash zone 27 of main product filter 19 contains a very low catalyst ash content and is ideal wash liquid for the last cake wash zone of waxy polymer filter 40. Thus, the wash liquid leaving wash zone 27 of filter 19 via line 30 is conveyed to wash zone 44 of filter 40. Similarly, the cake wash liquid leaving wash zone 44 of filter 40 still contains relatively little catalyst ash and is ideal as wash liquid for the next-to-last cake wash stage 25 of main product filter 19. Thus, wash liquid leaving zone 44 via line 26 is conveyed to second cake wash zone 25 of filter 19. Similarly, the wash liquid leaving zone 25 of filter 19 via line 29 is conveyed as the wash liquid to the first cake wash zone 43 of waxy polymer filter 40. The advantages of this countercurrent and alternating exchange washing between the two filters will be described later.

The final spent alcohol-rich cake wash liquid leaves waxy polymer filter 40 from the first cake wash zone 43 via line 49. This spent wash liquid is high in alcohol content and the catalyst ash concentration is quite small relative to the filter feeds in lines 17 and 39. Therefore, the spent wash liquid in line 49 is ideal and economical for precipitating the two polymer product fractions.

Thus, a portion of the spent wash in line 49 is fed to main product precipitator 8 via line 9, and another portion, usually the total remaining portion, is fed to waxy polymer precipitator 35 via line 36. If it is desired to leave the lowest molecular weight portion of the waxy polymer in solution in vessel 35 for further polymer fractionation, a portion of the spent alcohol-rich wash liquid in line 49 may be diverted from precipitator 35 via line 51.

The alcohol-rich second filtrate leaving zone 41 via line 42 contains substantially all of the soluble original catalyst ash and any residual dissolved waxy polymer. This filtrate is conveyed to vaporizer 50. Any spent alcohol-rich wash from the first cake wash zone 43 of filter 40 not desired for polymer precipitation is combined via line 51 with the second filtrate stream in line 42 to vaporizer 50. The combined second filtrate and spent wash portion is boiled almost to dryness in vaporizer 50. Some small residual liquid quantity, usually predominantly hydrocarbon or predominantly alcohol, depending on the relative volatilities, is left to contain the non-volatile catalyst ash and polymer residue, and this solution or slurry is rejected to fuel or other disposal via line 52.

The bulk of the alcohol-hydrocarbon components is passed from vaporizer 50 as a vapor mixture in line 53. A portion of this vapor is sent to fractionator 54 via line 55, and is separated into a substantially alcohol-free hydrocarbon diluent fraction and an alcohol fraction containing an allowable small quantity of hydrocarbon. The alcohol fraction leaves fractionator 54 via line 56 and enters line 28 as fresh alcohol-rich cake wash to the last cake wash zone 27 of main product filter 19. The hydrocarbon fraction leaves fractionator 54 via line 57. The major portion of this alcohol-free hydrocarbon stream is recycled to the reactor as diluent via line 3.

The remaining portion of the alcohol-diluent vapor mixture from vaporizer 50 passes to condenser 58 via line 59. The vapor portion is liquefied and leaves the condenser in line 59. This condenser stream is mixed with the remaining portion of the hydrocarbon fraction from fractionator 54 via line 60 to obtain the desired hydrocarbon/alcohol ratio of the combined mixture, and sent via line 23 as hydrocarbon-rich cake wash liquid to the first cake wash zone 22 of main product filter 19. A hydrocarbon-rich liquid sidestream from fractionator 54 containing a small percentage of alcohol, may be substituted for the substantially alcohol-free portion of the hydrocarbon fraction in line 60 for first cake wash zone 22 in order to realize better fractionator economy. All of vaporizer 50 product vapor can pass through fractionator 54, and cake wash stream in line 23 taken as a sidestream from fractionator 50 or made up by combining portions of fractionator overhead and bottoms streams from lines 56 and 57. However, the process as illustrated gives better overall economy and composition control on cake wash stream in line 23.

Makeup alcohol and diluent quantities are added via lines 61 and 62 to allow for losses. Fractionators 14 and 54 can optionally be replaced by a single fractionator which takes both streams from lines 55 and 10.

It should be noted that the hydrocarbon-rich cake wash coming into first cake wash and drain zone 22 of filter 19 through line 23 should be of approximately the same alcohol to hydrocarbon ratio and temperature as the feed slurry so as not to cause precipitation of dissolved waxy polymer in the cake liquid. Waxy polymer precipitated in the cake liquid stays with the main product and lowers the main product quality. Also, the filter may become inoperable with excess waxy polymer precipitation in the cake, which restricts the flow of filtrate. A cake wash liquid slightly richer in hydrocarbon concentration than the hydrocarbon alcohol fraction of the feed slurry can also be used, but this cake wash must be used at a somewhat lower temperature than the feed to offset its higher solvency relative to the feed liquid fraction. Alternatively, it can be used at a somewhat higher temperature if the extra dissolving action on the cake polymer is not undesirable. In other words, too much polymer solvating action by the cake wash may cause the cake to fuse when suction is applied and reduce the flow of filtrate. Also, the first cake wash liquid through line 23 can have a slightly higher alcohol to hydrocarbon ratio than the feed slurry providing that the wash temperature is higher than the feed. This will give the wash at least the same polymer solvency as the hydrocarbon-alcohol portion of feed liquid. However, the alcohol to hydrocarbon ratio and the temperature must be carefully controlled to obtain the same polymer solvency as the feed liquid. The particular ratio and temperature utilized for any given system can easily be obtained by routine experimentation.

It should also be noted that at least a portion of the waxy polymer by-product isolated through line 46 can be blended back with the main polymer product obtained from dryer 31, depending on the properties desired for the final polymer product, and for closer control of the waxy polymer portion to be rejected from the main product.

Also, it is desirable to use recycle filter gas such as unreacted olefins from the reactor in main polymer precipator 8. This recycle gas will necessarily contain alcohol and diluent vapor, and is preferably of about the same composition as the flash gas in line 10 from precipitator 8. Control of the recycle gas to this composition will prevent vaporization and auto-refrigeration of the cake liquid due to the gas flow through the cake when the filtrate is sucked through. It is important and is a feature of the invention that the recycle gas be employed at about the same temperature as the temperature of the liquid in precipitator 8. If the recycle gas were at a lower temperature, cooling of the cake liquid would cause waxy polymer to precipitate in the filter cake interstices, causing the cake to seal and making the filtration more difficult. If the gas is too hot due to recycle compression heat, it may cause the polymer cake to become sticky and difficult to filter. It is another important feature of this invention to maintain the filtrate entering line 22 at a pressure substantially equal to or above that in vessel 8 in order to insure against flashing and auto-refrigeration of the cake liquid in filter zone 20. This pressure control can be effected with pump 18 in allowing for the pressure drop across the cake, screen, etc. Excessive cooling of cake liquid is to be avoided to prevent waxy polymer precipitation with the main product.

The advantages of the present process will be apparent from a consideration of the following example which is given to illustrate and not to limit the invention.

EXAMPLE I

Propylene was polymerized in reactor 4 using as catalyst titanium trichloride and aluminum triethyl in xylene diluent to produce a 100 lbs. of polypropylene. Table I lists typical stream compositions, quantities, and temperatures which are employed in the process given in FIGURE I based on the production of 100 lbs. of total polypropylene in reactor 4. By definition, the waxy polymer fraction is the polymer in solution in line 17 leaving precipitator 8; and the main product polymer is the polymer precipitated in precipitator 8. The alcohol used in this example is methanol.

*Table I*

| Stream components | Quantities lbs. of individual components in the various streams are identified by line numbers in Fig. 1 | | | | | | | | | |
|---|---|---|---|---|---|---|---|---|---|---|
| | Reactor feed, lines 1, 2, and 3 | Reactor discharge, line 7 | Unreacted olefins, line 16 | First precipitating alcohol, line 9 | Hydrocarbon rich spent wash, line 24 | Precipitator discharge, line 17 | Filter 19 zone exit cakes | | | |
| | | | | | | | Filtration, zone 20 | 1st wash, zone 22 | 2nd wash, zone 25 | 3rd wash, zone 27 |
| Main polymer product | | 85 | | nil | | 85 | 85 | 85 | 85 | 85 |
| Waxy polymer by-product | | 15 | | nil | 1.2 | 16.2 | 1.7 | 0.5 | 0.5 | 0.5 |
| Hydrocarbon diluent | 900 | 900 | nil | 108 | 272 | 1,280 | 136 | 136 | 43 | 20 |
| Alcohol | | | nil | 252 | 68 | 320 | 34 | 34 | 127 | 150 |
| Soluble catalyst | 1 | 1 | | .028 | .083 | 1.111 | .119 | .036 | .006 | .0003 |
| Olefins | 120 | 20 | 20 | | | | | | | |
| Total | 1,021 | 1,021 | 20 | 360 | 341.3 | 1,702.3 | 256.8 | 255.54 | 255.51 | 255.5 |
| Alcohol/diluent ratio | | | | 70/30 | 20/80 | 20/80 | 20/80 | 20/80 | 75/25 | 88/12 |
| Temperature, °F | 120 | 170 | | 120 | 120-170 | 120-170 | 120-170 | 120-130 | 120 | 120 |
| Pressure, p.s.i.g | | | | | 4 | 3 | 5 | 5 | 5 | 5 |

| Stream components | Alcohol-rich cake wash, line 28 | Filtration zone filtrate, line 21 | Precipitating alcohol, line 36 | Waxy polymer slurry, line 39 | Filtrate from zone 41, line 42 | Spent alcohol rich wash, line 49 | Filter 40 zone exit cakes | | |
|---|---|---|---|---|---|---|---|---|---|
| | | | | | | | Zone 41 | Zone 43 | Zone 44 |
| Waxy polymer | | 14.5 | nil | 14.5 | 0.5 | | 14 | 14 | 14 |
| Hydrocarbon | 74 | 1,144 | 96 | 1,240 | 1,220.2 | 204 | 19.8 | 28 | 3.8 |
| Alcohol | 606 | 286 | 224 | 510 | 501.8 | 476 | 8.2 | | 24.2 |
| Soluble catalyst | | .992 | .025 | 1.017 | 1.00 | .053 | .017 | .0062 | .0003 |
| Total | 680 | 1,445.5 | 320 | 1,765.5 | 1,723.5 | 680 | 42 | 42 | 42 |

| Stream components | Alcohol-rich cake wash liquids | | | Rejected catalyst residue, line 52 | Fractionator 54 balance | | | Reactor recycle, line 3 | Fresh alcohol-rich cake wash (26) | | |
|---|---|---|---|---|---|---|---|---|---|---|---|
| | Line 30 | Line 26 | Line 29 | | Feed, line 55 | Alcohol fract., line 56 | Hydr. fr. line 57 | | Fractionator 54 product, line 56 | Dryer condensates, line 34 | Total, line 28 |
| Diluent | 680 | 680 | 680 | 2 | 1,053.2 | | 1,005 | 900 | | | 72 |
| Alcohol | | | | | 433.8 | 433.8 | nil | | 48.2 | 23.8 | 608 |
| Waxy polymer | nil | nil | nil | 0.5 | | | | | 433.8 | 174.2 | |
| Soluble cat | .0055 | .011 | .043 | 0.999 | | | | | | | |
| Total | 680 | 680 | 680 | 3.5 | 1,380 | 482 | 1,005 | 900 | 482.0 | 198.0 | 680 |

Table I—Continued

| Stream components | Hydrocarbon-rich cake wash | | |
|---|---|---|---|
| | Condenser 58 product, line 59 | Fractionator 54 product, line 60 | Total, line 23 |
| Diluent | 165 | 107 | 272 |
| Alcohol | 68 | | 68 |
| Total | 233 | 107 | 340 |

Table II shows the composition of the separated polymer products.

Table II

POWDER PRODUCTS

| | Main from dryer 31 | Waxy, line 46 |
|---|---|---|
| Main polymer | 85 | |
| Waxy | 0.5 | 14 |
| Liquid | nil | nil |
| Total | 85.5 | 14 |
| Ash, p.p.m | 9 | 20 |

The data on the cake washing efficiency of Example I is as follows:

(1) Drained pan filter cake=2 lbs. liquid per lbs. dry polymer before and after each cake wash.
(2) The percentage of initial cake liquid displaced by wash liquid is given as follows versus the quantity of wash liquid used relative to cake polymer quantity per wash.

| Lbs. wash liquid per lb. dry polymer in wet cake | 4 | 5 | 6 | 7 | 8 | 19 |
|---|---|---|---|---|---|---|
| Percent initial cake liquid displaced | 70 | 75 | 79 | 83 | 87 | 95 |

Based on the above data, the advantage of washing both polymer cakes with the same wash liquid is apparent from the following:

Total lbs. reactor polymer (85 main and 15 waxy) __ 100
Parts per million soluble ash left in main polymer ____ 9
Parts per million soluble ash left in waxy polymer ___ 20
Total alcohol-rich wash liquid, lbs. _____ 680

If each polymer is washed separately with its own portion of alcohol-rich wash liquid, and with the same number of wash stages, the alcohol-rich cake wash liquid to achieve the same ash reduction on 100 lbs. total polymer is as follows:

Lbs. alcohol
For main product _____ 630
For waxy product _____ 112

Total _____ 742

This is a 9% increase in total alcohol wash, but a 13% increase in the quantity to be fractionated.

As shown in Table I, only 3.3% of the dissolved waxy polymer in precipitator 8 is left with the main product. Without the use of the controlled polymer solvency cake wash in line 23 and use of this wash for precipitator 8 dilution, about 16% of the original dissolved waxy polymer would be retained in the main product. In other words, conventional use of all alcohol-rich cake wash for deashing on filter 19 would cause precipitation of 16% of the original dissolved waxy polymer in the filter cake. The disadvantage of inefficient extraction of waxy polymer can be seen by reference to the following data on main product quality versus percent of total polymer extracted.

| Total polymer extracted, percent | 0 | 5 | 10 | 15 | 20 |
|---|---|---|---|---|---|
| Product tensile strength, p.s.i | 3,400 | 3,750 | 4,200 | 4,550 | 4,700 |

It can be seen that the greater percentage of total polymer extracted i.e. waxy polymer removed, the higher the tensile strength of the product polymer.

Another disadvantage of inefficient waxy polymer extraction is that the main product is more tacky when extruded as film or molded for various uses.

As shown also in Table I, the use of condenser 58 for fractionator 54 by-pass and the use of dryer condensates reduces the alcohol fractionation burden on fractionator 54 by about 40%.

Consistent with the material balance of Table I and FIGURE I, the use of spent hydrocarbon-rich cake wash for dilution of precipitator 8 slurry reduces waxy polymer and the final ash about 15% for the main product, and reduces ash about 10% for the waxy by-product, compared to the process where the spent wash is not so used. The advantage is even more pronounced when fewer cake washing stages are used on the two filters.

In certain cases it may be desirable to increase the alcohol concentration in waxy polymer precipitator 35 when this polymer is low in molecular weight and more difficult to precipitate. Rather than increasing the quantity of precipitating or cake wash alcohol for this purpose, the desired increase in alcohol concentration may be realized by sending the hydrocarbon-rich spent wash in line 24 directly to a vaporizer such as vaporizer 50, rather than to precipitator 8. In this case, it is a feature of this invention to vaporize the spent hydrocarbon-rich cake wash separately from vaporizer 50, to condense the resulting vapor separately, and to recycle this condensate immediately as first stage cake wash in zone 22 of filter 19 in order to reduce the load on fractionator 54. Some residual liquid will remain unboiled from the separate vaporizer to contain the nonvolatile waxy polymer and catalyst ash present in the spent hydrocarbon-rich wash in line 24. The residual liquid from the separate vaporizer may be recycled to precipitator 35 for precipitation and recovery of the waxy polymer in the spent hydrocarbon-rich wash.

Modifications in the above process can be carried out within the scope of the invention.

What is claimed is:

1. In the process for polymerizing α-olefins to form normally solid olefin polymers by contacting the olefins under polymerization conditions in the presence of a low boiling hydrocarbon diluent with a polymerization catalyst containing at least a partially reduced compound of a heavy metal of groups IV, V, VI and VIII of the Periodic System to form a polymer product slurry, the improvement comprising controlling the amount of low molecular weight waxy polymer in the final product by the steps of (1) adding to the product slurry 10 to 30 vol. percent (based on the volume of slurry) of an alcohol-diluent mixture containing 60–90 vol. percent of a $C_1$–$C_6$ aliphatic alcohol, to precipitate a controlled quantity of waxy polymer out of solution with the main polymer product, (2) filtering the resulting slurry at a temperature in the range of 100–180° F. with the relative precipitation and filtration pressures controlled such that the equilibrium vapor pressure of the filter feed slurry is no higher than the gas pressure on the suction side of the filter screen, (3) first washing the resulting precipitate as polymer cake on the filter with a wash solution having substantially the same polymer solvency as is present in the first filter feed slurry, (4) subsequently washing the polymer cake at least one time with a more alcohol-rich solution of lower ash content than the diluent-alcohol fraction in the filter feed, and (5) drying the polymer cake.

2. The process of claim 1 wherein the wash solution in step (3) has substantially the same temperature and ratio of low boiling hydrocarbon to low molecular weight alcohol as is present in the first filter feed slurry.

3. The process of claim 1 wherein a portion of the first cake wash solution of step (3) is used to wash the filter screen after the cake is discharged from the screen and prior to adding new feed slurry to the emptied filter screen.

4. The process of claim 1 wherein at least a portion of the spent cake washing solution from step (3) is added to the product slurry with the low molecular weight alcohol in step (1) to achieve better deashing and better separation of main product and waxy polymer.

5. The process of claim 1 wherein the filtrate from step (2) is treated with at least a portion of the spent alcohol-rich cake wash solution from step (4) to precipitate at least a portion of the waxy polymer therefrom, filtering the precipitated waxy polymer from the resulting slurry, washing the resulting polymer cake on the filter with a solution richer in alcohol and leaner in dissolved polymerization catalyst than the waxy polymer filtrate, and drying the washed cake.

6. The process of claim 5 wherein the waxy polymer cake is dried in a low-temperature vacuum dryer.

7. The process of claim 5 wherein the spent alcohol-rich wash solution from step (4) is first used to wash the precipitated waxy polymer filter cake.

8. The process of claim 7 wherein multiple countercurrent filter cake washing stages are used for washing both the main product and the waxy polymer with alcohol-rich liquid and the alcohol-rich spent wash from the last cake wash stage of step (4) is passed first to the last cake wash stage of the waxy product polymer, then to the next to the last wash stage of the main product polymer and continuing the washing in this manner countercurrently, alternating between the main polymer product and the waxy polymer through all the cake washing steps with alcohol-rich wash liquid.

9. The process of claim 1 wherein at least a portion of the spent wash solution from step (4) is used to precipitate the main product polymer in step (1).

10. The process of claim 7 wherein at least a portion of the spent alcohol-rich waxy polymer cake wash solution is used to precipitate the main product polymer in step (1).

11. The process of claim 5 wherein the cake liquids removed as vapor in the main product and waxy polymer dryers are condensed and used as alcohol-rich fresh cake wash in step (4).

12. The process of claim 5 wherein the waxy polymer slurry filtrate containing substantially all of the polymerization catalyst residue is vaporized to almost complete dryness, the resulting vapor condensed, a portion of the condensed vapor separated into hydrocarbon-rich and alcohol-rich fractions, a portion of the hydrocarbon-rich fraction combined with the remaining portion of the condensed vapor, and the combined liquids used to wash the polymer cake in step (3).

13. The process of claim 1 wherein filter blanket gas passing through the cake under suction is equilibrated with the filtrate, compressed, cooled to substantially the filtrate temperature, and recycled to the cake side of the enclosed filter.

14. The process of claim 13 wherein the filter blanket gas is predominantly unreacted olefin from the product slurry, containing equilibrium quantities of hydrocarbon diluent and alcohol.

15. The process of claim 1 wherein at least a portion of the spent wash in step (3) is separately vaporized to substantially complete dryness, the resulting vapor condensed and recycled immediately to the first cake wash in step (3), and the residual liquid from the separate vaporization is combined with the first filtrate for recovery of waxy polymer.

16. The process of claim 1 wherein the polymer is polypropylene, the diluent is xylene and the alcohol is methanol.

17. The process of claim 5 wherein the polymer is polypropylene and a portion of the dried waxy polymer is blended with the dried main product polymer.

References Cited in the file of this patent

UNITED STATES PATENTS

| | | |
|---|---|---|
| 2,921,933 | McKinnis et al. | Jan. 19, 1960 |
| 2,996,492 | Tegge et al. | Aug. 15, 1961 |
| 3,014,019 | Czenkusch | Dec. 19, 1961 |

OTHER REFERENCES

Technique of Organic Chemistry, edited by Weissberger, volume III, part I, pages 729–730 (1956), Interscience Publishers, Inc., New York.